US012016807B2

(12) United States Patent
Christensen

(10) Patent No.: US 12,016,807 B2
(45) Date of Patent: Jun. 25, 2024

(54) RECLINING CHAIR AND METHOD OF USE THEREOF

(71) Applicant: DAN-REHAB A/S, Tørring (DK)

(72) Inventor: Hans Balle Christensen, Herning (DK)

(73) Assignee: DAN-REHAB A/S, Tørring (DK)

( * ) Notice: Subject to any disclaimer, the term of this patent is extended or adjusted under 35 U.S.C. 154(b) by 464 days.

(21) Appl. No.: 17/439,969

(22) PCT Filed: Mar. 17, 2020

(86) PCT No.: PCT/DK2020/050066
§ 371 (c)(1),
(2) Date: Sep. 16, 2021

(87) PCT Pub. No.: WO2020/187376
PCT Pub. Date: Sep. 24, 2020

(65) Prior Publication Data

US 2022/0249307 A1 Aug. 11, 2022

(30) Foreign Application Priority Data

Mar. 18, 2019 (DK) ............................ PA201970169

(51) Int. Cl.
*A61G 5/10* (2006.01)

(52) U.S. Cl.
CPC ......... *A61G 5/1075* (2013.01); *A61G 5/1002* (2013.01)

(58) Field of Classification Search
CPC ................ A61G 5/1075; A61G 5/1002; A61G 2203/74; A61G 5/1067; A61G 5/10; A47C 1/032
See application file for complete search history.

(56) References Cited

U.S. PATENT DOCUMENTS 2,558,171 A 6/1951 Chesley
3,198,576 A * 8/1965 Rosmarin .............. A47C 1/032 297/440.22

(Continued)

FOREIGN PATENT DOCUMENTS

DE 202015006541 2/2017
DE 202015006541 U1 * 2/2017

(Continued)

OTHER PUBLICATIONS

DK Search Report for corresponding Danish Patent Application No. PA 2019 70169 dated Nov. 5, 2019, 3 pages.

(Continued)

*Primary Examiner* — James A Shriver, II
*Assistant Examiner* — Michael T. Walsh
(74) *Attorney, Agent, or Firm* — Lee & Hayes, P.C.

(57) ABSTRACT

A reclining chair includes a frame and a back part with a back support slidably connected to a back frame hinged on a frame rotation point on the frame. A seat part, including a seat frame and a seat, is pivotably connected to the back frame at a chair joint. A reclining mechanism includes an arm pivot point fixed to the frame. A first arm extends from the arm pivot point to a second arm at an arm suspension point. The second arm is pivotably connected to the chair joint. When the back part reclines from an upright position, the back frame rotates, the first arm rotates, the chair joint moves towards the seat part, and a connecting arm extending from the back support and mechanically linked to the first arm and the second arm pulls the back support so the back support slides towards the seat part.

10 Claims, 8 Drawing Sheets

(56) References Cited

U.S. PATENT DOCUMENTS

Figure 1:
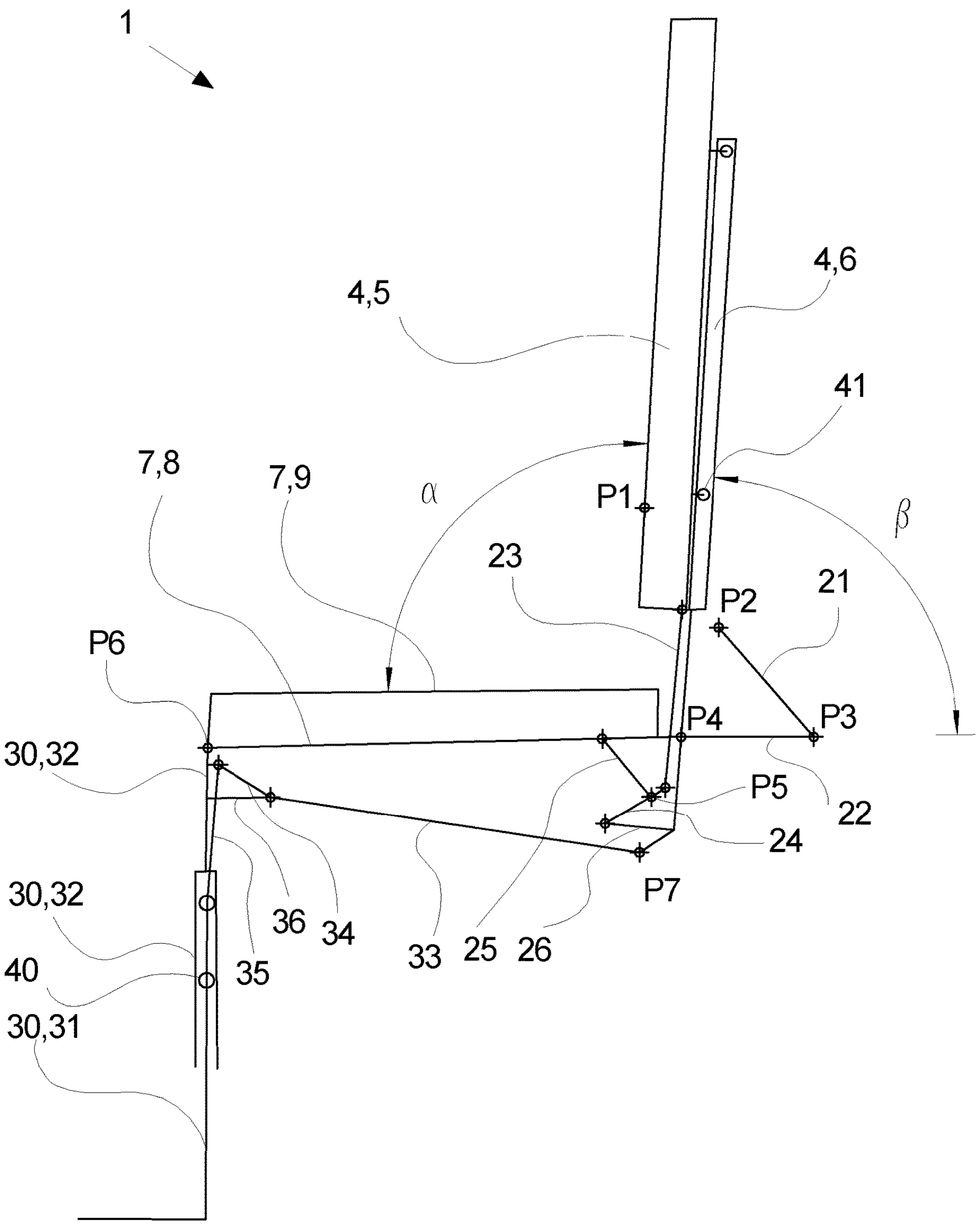

| | | | | | |
|---|---|---|---|---|---|
| 4,285,541 | A * | 8/1981 | Onishi | A61G 5/006 5/81.1 R |
| 5,050,899 | A * | 9/1991 | Stensby | A61G 5/006 5/81.1 R |
| 5,181,762 | A * | 1/1993 | Beumer | A61G 5/1067 297/358 |
| 5,556,157 | A * | 9/1996 | Wempe | A61G 5/128 297/423.26 |
| 6,015,189 | A * | 1/2000 | Broadhead | A61G 5/1067 297/358 |
| 6,902,233 | B2 * | 6/2005 | Tseng | A47C 1/0355 297/83 |
| 9,901,176 | B2 | 2/2018 | Parker et al. | |
| 2010/0244522 | A1 | 9/2010 | Fukai | |
| 2020/0337920 | A1 * | 10/2020 | Hansen | A61G 5/1059 |

FOREIGN PATENT DOCUMENTS

| | | | | |
|---|---|---|---|---|
| EP | 0068668 | A1 * | 1/1983 | |
| EP | 1522298 | | 4/2005 | |
| EP | 1522298 | A2 * | 4/2005 | A61G 5/1067 |
| EP | 2946758 | | 11/2015 | |
| EP | 2946758 | A1 * | 11/2015 | A61G 5/1048 |
| NL | 9001053 | A * | 12/1991 | A61G 5/006 |

OTHER PUBLICATIONS

PCT Search Report for corresponding PCT Application No. PCT/DK2020/050066 dated Jun. 15, 2020, 3 pages.

* cited by examiner

RECLINING CHAIR AND METHOD OF USE THEREOF

This Application claims priority to PCT Application No. PCT/DK2020/050066, filed Mar. 17, 2020, which claims priority to DK Patent Application No. PA 2019 70169, filed Mar. 18, 2019, the contents of each of which is incorporated herein by reference.

FIELD OF THE INVENTION

The invention relates to a reclining chair comprising a back part comprising a back support and a back frame and a seat part comprising a seat frame and a seat. The reclining chair also comprises a reclining mechanism. Furthermore, the invention relates to use of a reclining chair.

BACKGROUND OF THE INVENTION

As people grow older, their physical strength deteriorates gradually and therefore health service may be needed to aid in bathing, toileting or other needs. It is therefore known to provide chairs for people with reduced mobility due to lack of sufficient physical strength, mental or physical handicaps or other kind of nuisance which may lead to the person being less independent as regards to mobility. To help the nursing personnel in the process of aiding such persons for carrying out the mentioned basic needs or getting in/out of a bed, these types of chairs are typically reclinable.

The problem with such a reclinable chair is that, when the chair is reclined, it becomes unstable due to the displacement of the person's center of mass.

Therefore, it is known to provide reclinable chairs with a plurality of actuators for actuating individual components of the chair such that the displacement of the user's center of mass is minimized. However, providing the chair with a plurality of actuators involves a lot of costs and the chair becomes complex to use.

From U.S. Pat. No. 9,901,176 B2 it is known to provide for a chair with a recline mechanism comprising sliding track, followers, drag links and other parts which make up the recline mechanism such that the center of mass of the user is displaced less in the horizontal plane.

However, a recline mechanism as suggested in U.S. Pat. No. 9,901,176 B2 is relatively complex and when the chair is reclined, substantial amount of friction is generated between the back of the user and the chair which makes the chair uncomfortable to use.

It is therefore an object of the present invention to provide for a reclining chair which solves the above-mentioned problems.

THE INVENTION

The invention provides for a reclining chair comprising a frame for supporting the reclining chair on an underlying surface, a back part comprising a back support slidable connected to a back frame, wherein the back frame is hinged on a frame rotation point on the frame. The reclining chair also comprises a seat part comprising a seat frame and a seat, the seat part being pivotably connected to the back frame at a chair joint, and a reclining mechanism, wherein the reclining mechanism comprises an arm pivot point fixed to the frame and located behind the back frame. A first arm extends from the arm pivot point to a second arm at an arm suspension point which is also located behind the back frame. The second arm is pivotably connected to the chair joint. When the back part is reclined backwards from an upright position to a reclined position, the back frame rotates around the frame rotation point such that the first arm rotates around the arm pivot point and the chair joint moves towards the seat frame. A connecting arm extends from the back part and is mechanically linked to the first arm and the second arm and pulls the back support such that the back support slides in relation to the back frame and towards the seat part.

It is advantageous to provide a reclining chair with a reclining mechanism comprising a first arm and a second arm rotating around a frame rotation point and a connecting arm pulling on the back part in that the center of mass of the user is moved very little in the horizontal plane and the friction between the back of the user and the chair is reduced when the chair is being reclined.

Furthermore, the reclining mechanism couples the translating motion of the back support and the rotational motion of the back part in one simple and compact mechanism, whereby the reclining chair is more efficient and more comfortable for the user.

The reclining mechanism of the invention also provides for a compact and simple mechanical linkage for reclining the chair from an upright position to a reclined position. The compactness of the reclining mechanism is advantageous in that space, which would otherwise be occupied by sliding tracks, followers, links or other mechanical components, is freed such that the space may be used for providing the chair with components relating to servicing of the user whereby a wider and more versatile range of service is provided. The compactness is naturally also advantageous in that it is more lightweight.

Also, minimizing the horizontal movement of the center of mass is advantageous in that the wheel base of the chair may be designed narrower such that the reclining chair is less bulky.

In this context, the term "behind" should be understood as the side of the back part which faces the direction of motion when the back part is being reclined—i.e. the backside of the chair which is opposite the frontside on which a use of the chair rests. However, it should also be noted that throughout this document any reference to orientation—such as up, down, over, under etc. refers to the chair in its normal upright position (with the back raised or reclined) where the frame supports the reclining chair on the underlying surface and the seat of the chair is facing upwards.

Also, in this context, the term "mechanically linked" should be understood as a relation between two or more mechanically linked components. This relationship does not necessarily have to be established by one direct mechanical connection. It may merely be established as a consequence of the movement of a first component and, through a series of mechanical joints, links, gearings or other type of mechanical components, affects the movement of a second component, which is not necessarily directly connected to the first component.

In this context, the term "reclining chair" should be understood as a chair comprising some kind of pivotal backrest so that the backrest may be tilted backwards to position the user in a more horizontal position—such a reclining chair may be any kind of dentist chair, arm chair, bathing chair, toilet chair or any other type of chair in which a reclining function may be needed.

In an aspect of the invention, the seat part comprises a through opening and a container placed under said through opening.

This is advantageous in that the user may go to toilet anywhere and anytime while seated in the reclining chair. The container may then be emptied at a later point by the service personnel.

In this context, the term “container” should be understood as any kind of reservoir which may be positioned under the through opening of the seat part and which at least partially fits the size of through opening such as a pot, a plastic bag, a bowl, a tray or other kind of container for receiving the toileting residues.

In an aspect of the invention, the reclining mechanism further comprises a lever arm, a seat linking arm and a back frame arm. The connecting arm is pivotably connected to a first end of the lever arm, the seat linking arm is pivotably connected to an attachment point on the lever arm and the back frame arm is pivotably connected to a second end of the lever arm and rigidly connected to the back frame.

It is advantageous to provide the reclining mechanism with a lever arm, a seat linking arm and a back frame arm and wherein the connecting arm is connected to the lever arm in that the pull-down motion of the back support is mechanically linked to the reclining motion of the back part whereby the translating motion of the back support is precisely linked to the reclining motion. Thereby, no individual actuators are needed to actuate individual components of the reclining chair.

In an aspect of the invention, the attachment point is located between the ends of the lever arm.

It is advantageous to position the attachment point between the ends of the lever arm in that a levering effect between the lever arm and the connecting arm may be obtained. This is advantageous in that the amount of translation of the back support in relation to the reclining of the back part can be controlled precisely by adjusting the position of the attachment point between the ends of the lever arm.

In an aspect of the invention, the arm suspension point is located behind and in a lower position than the arm pivot point when the back part is in an upright position.

Arranging the arm suspension point behind and in a lower position than the arm pivot point when the back part is in an upright position is advantageous in that the angle between the seat part and back part is substantial constant in the initial phase of the reclining and when the arm pivot point is directly below the arm suspension point, the reclining chair will begin to “open up”, i.e. the angle between the seat part and the back part increases, as the back part is further reclined. This is advantageous in that user of the reclining chair will undergo a smooth transition from a substantially sitting position towards a lying down position by a simple, mechanical linkage and in that, by not opening the hip angle of chair and thereby the user until the chair is partly reclined, the reclining process is more gentle and pleasant to the user.

In an aspect of the invention, the reclining chair further comprises a leg rest pivotably connected to a leg pivot point and mechanically linked to the reclining mechanism.

It is advantageous if the reclining chair comprises a leg rest mechanically linked to the reclining mechanism in that movement of the leg rest is coupled to the reclining motion of the reclining chair. This is advantageous in that the legs of the user may be supported by the leg rest at all times, i.e. when the chair is in an upright position and also when in a reclined position.

In an aspect of the invention, the leg rest comprises a leg support and a leg rest frame and wherein the leg rest frame is pivotably connected to the leg pivot point, the leg support is mechanically linked to reclining mechanism such that when the back part is reclined from an upright position to a reclined position, the leg rest rotates around the leg pivot point and folds upwards whereby the leg support slides in relation to the leg rest frame and away from the seat part.

If a leg rest is simply folded upwards as the chair is reclined, substantial friction may be generated between the leg of the user and the leg rest which may be uncomfortable for the user. Therefore, it is advantageous to provide the leg rest with a leg rest frame slideable connected to a leg support and mechanically linked to the reclining mechanism in that the reclining of the chair is coupled to the upward folding of the leg rest via the reclining mechanism whereby friction between the user and the leg rest may be reduced.

In an aspect of the invention, the reclining chair comprises a recline actuator for reclining said reclining chair from an upright position to a reclined position.

It is advantageous to provide the reclining chair with a recline actuator in that the reclining motion may be driven by the recline actuator instead of by manual force.

It should be emphasized that in this context the term “actuator” should be understood as an electrical actuator, hydraulic actuator, pneumatic actuator or other type of actuator. It could also be a servosystem, pulley system, gear system or other kind of mechanism for driving the reclining motion.

In an aspect of the invention, the recline actuator is pivotably connected to the back part and the frame.

It is advantageous to pivotably connect the recline actuator to the back part and the frame in that the recline actuator pulls on the back part by transferring forces through the frame which is usually constructed in a stiff and strong configuration than other parts of the reclining chair and therefore more suitable for transferring forces.

The invention also provides for use of a reclining chair according to any of the previously described reclining chairs when bathing a user.

Usually, the user is naked when bathing. Therefore, it is advantageous to use the reclining chair according to the previously described reclining chair for bathing a user in that such a reclining chair provides for a smooth transition between the sitting position to the lying down position without inducing friction on the back of the user, which may be uncomfortable.

FIGURES

Figure 2:
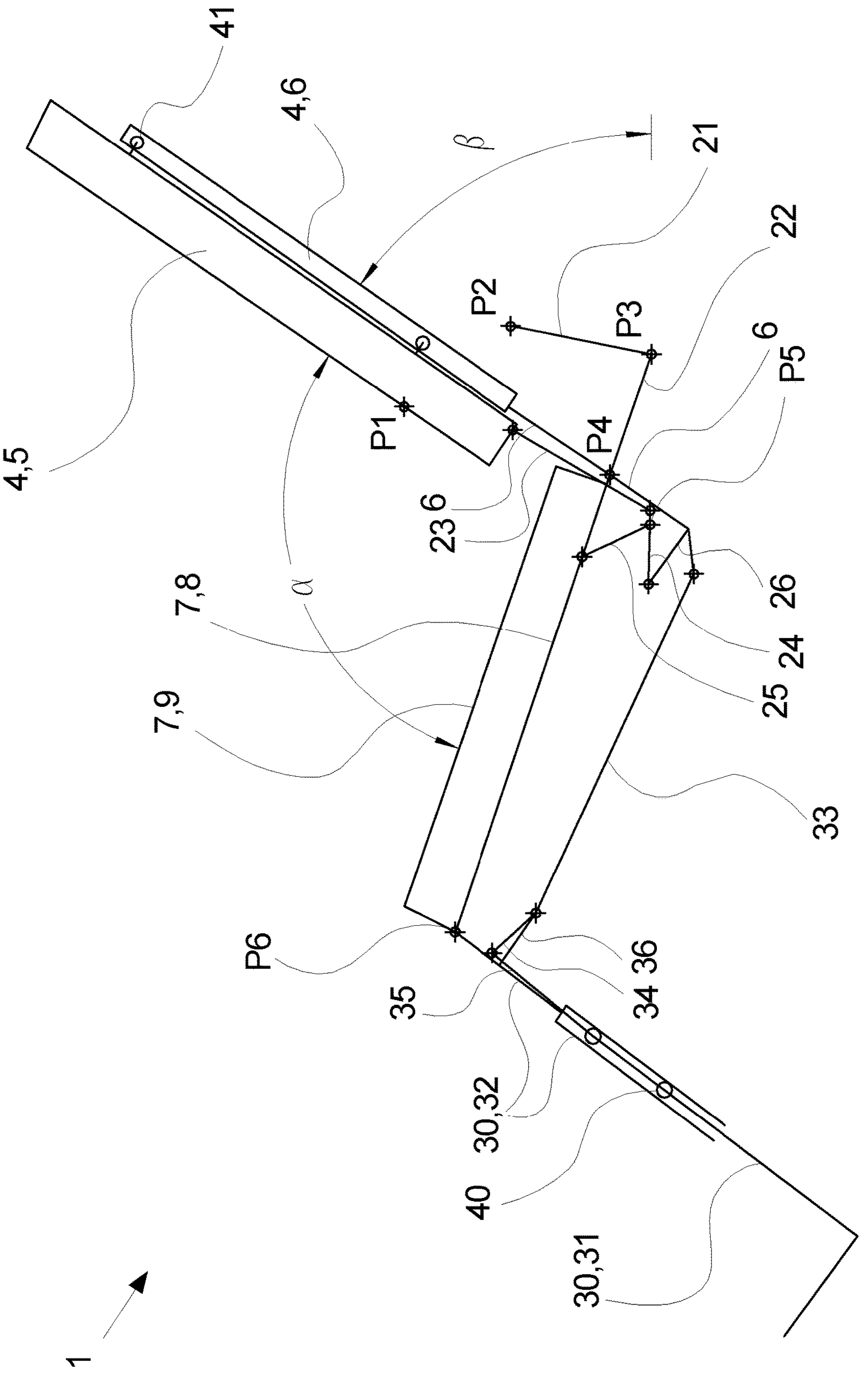
Figure 3:
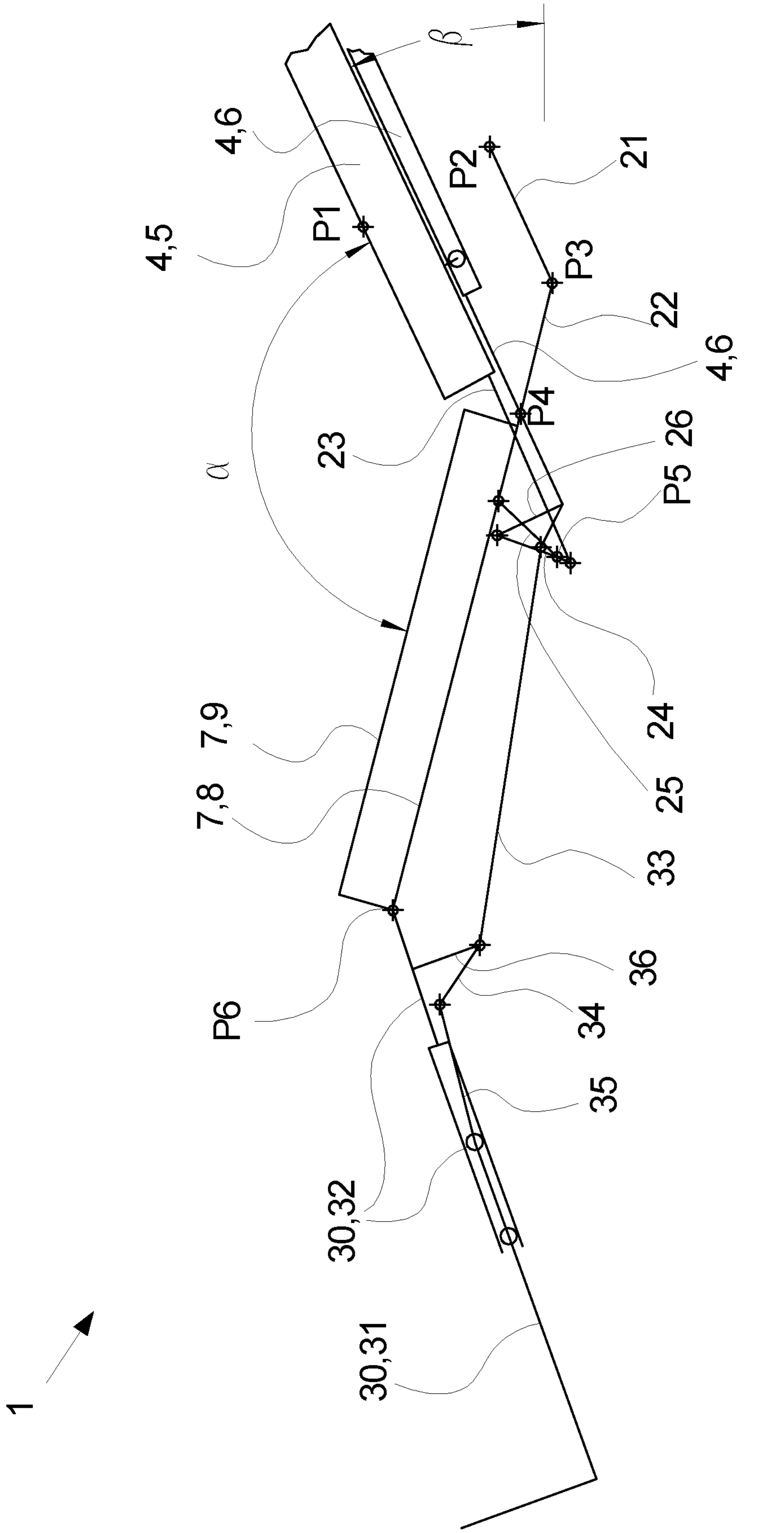
Figure 4:
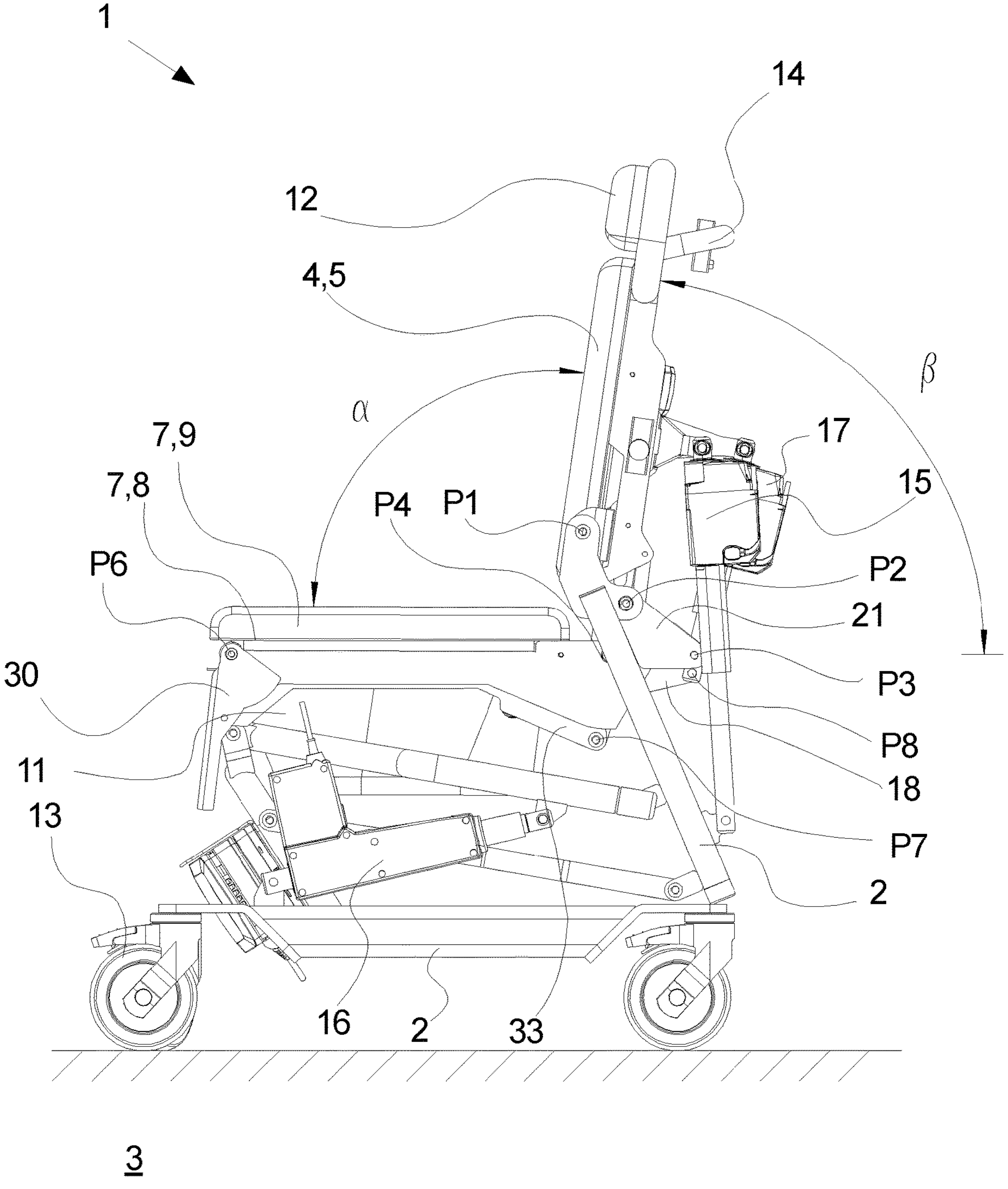
Figure 5:
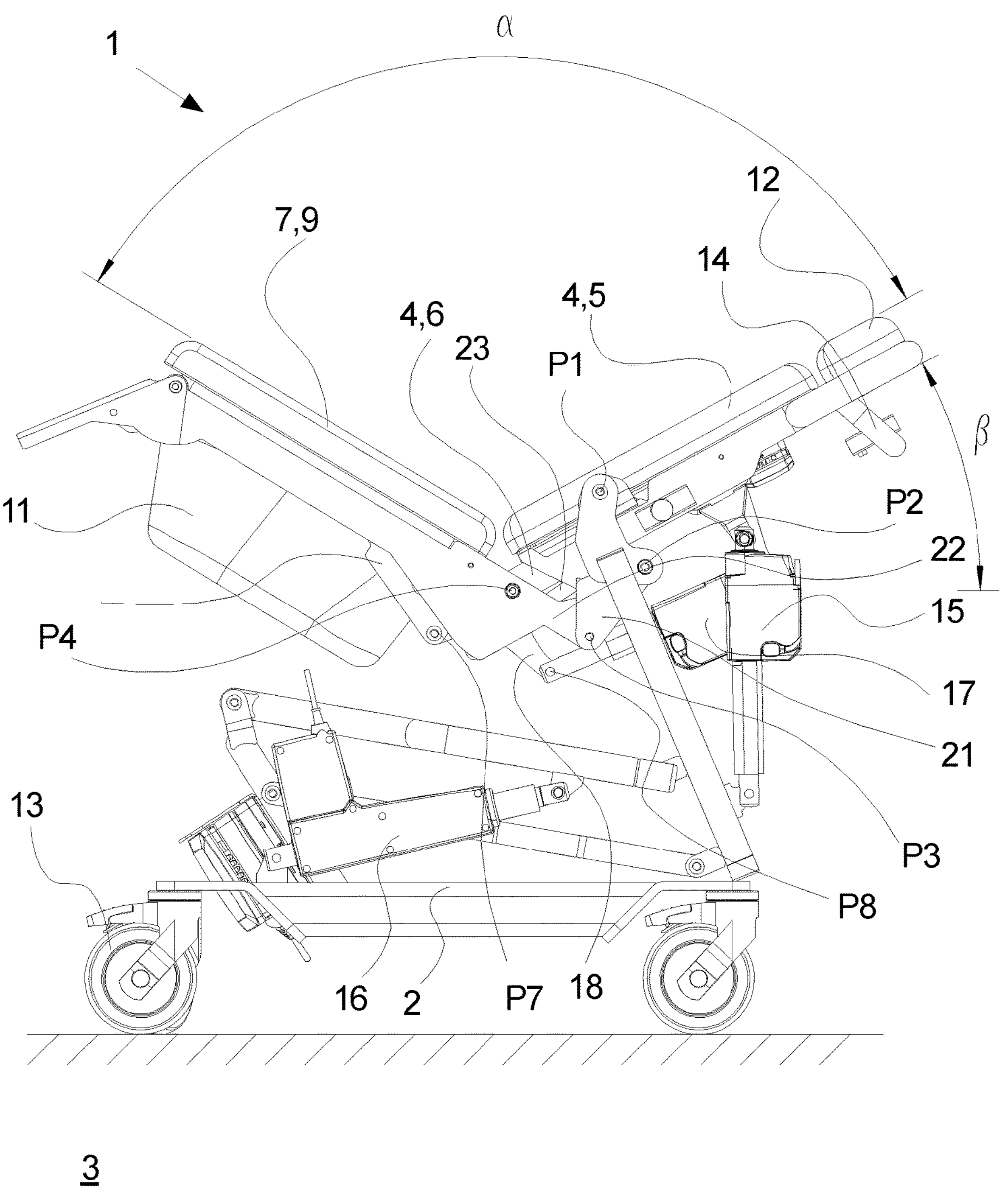
Figure 6:
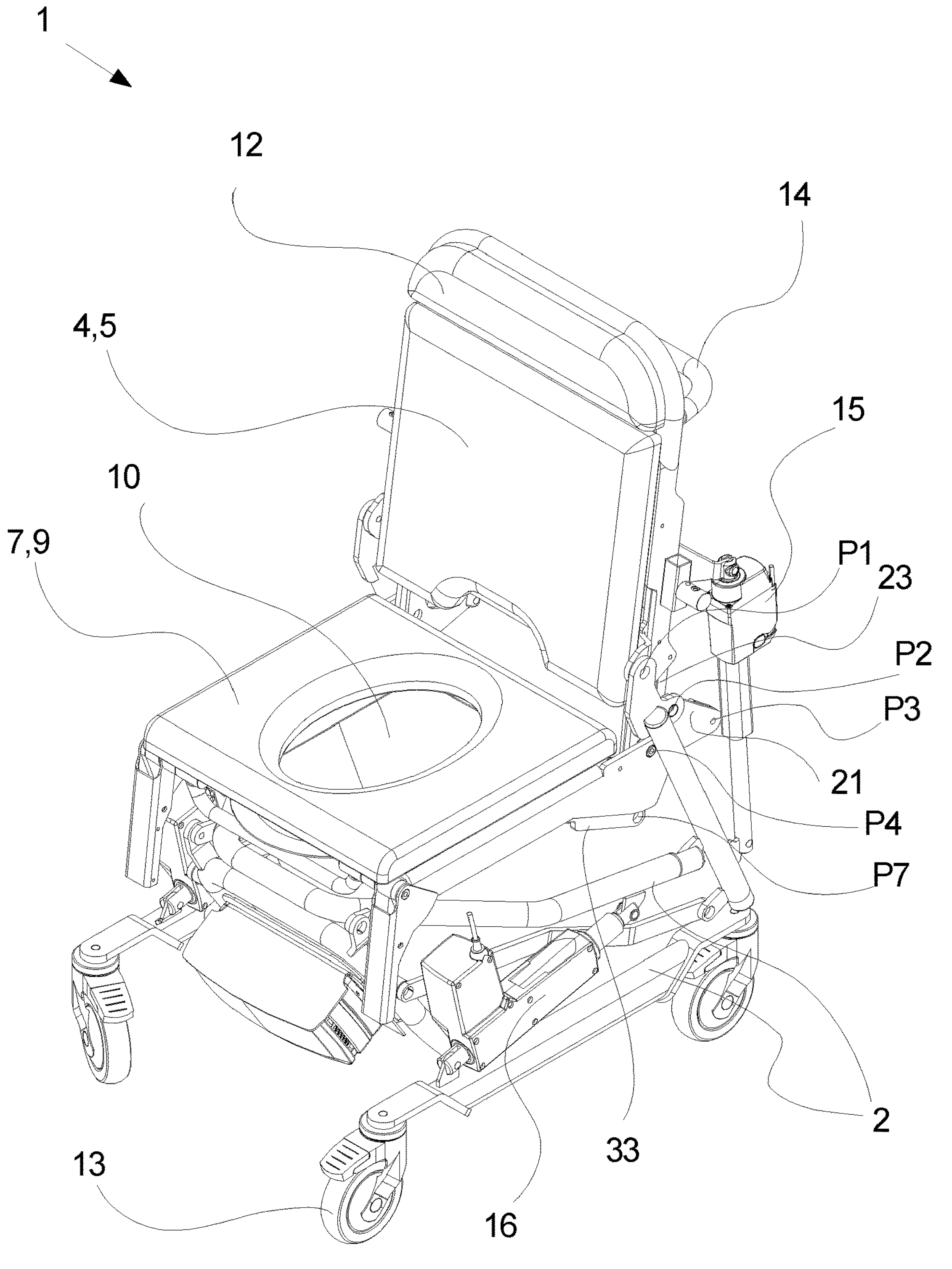
Figure 7:
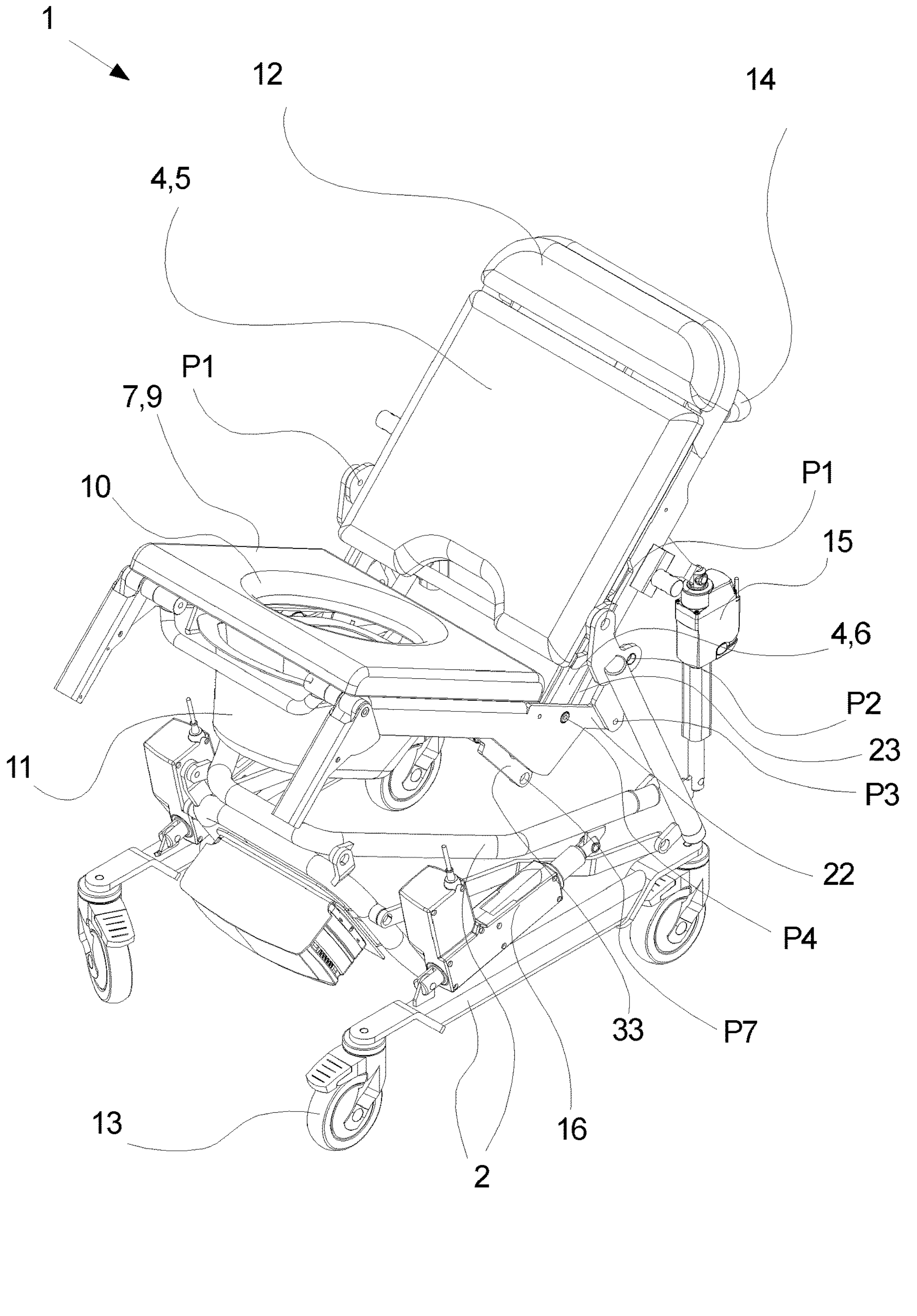
Figure 8:
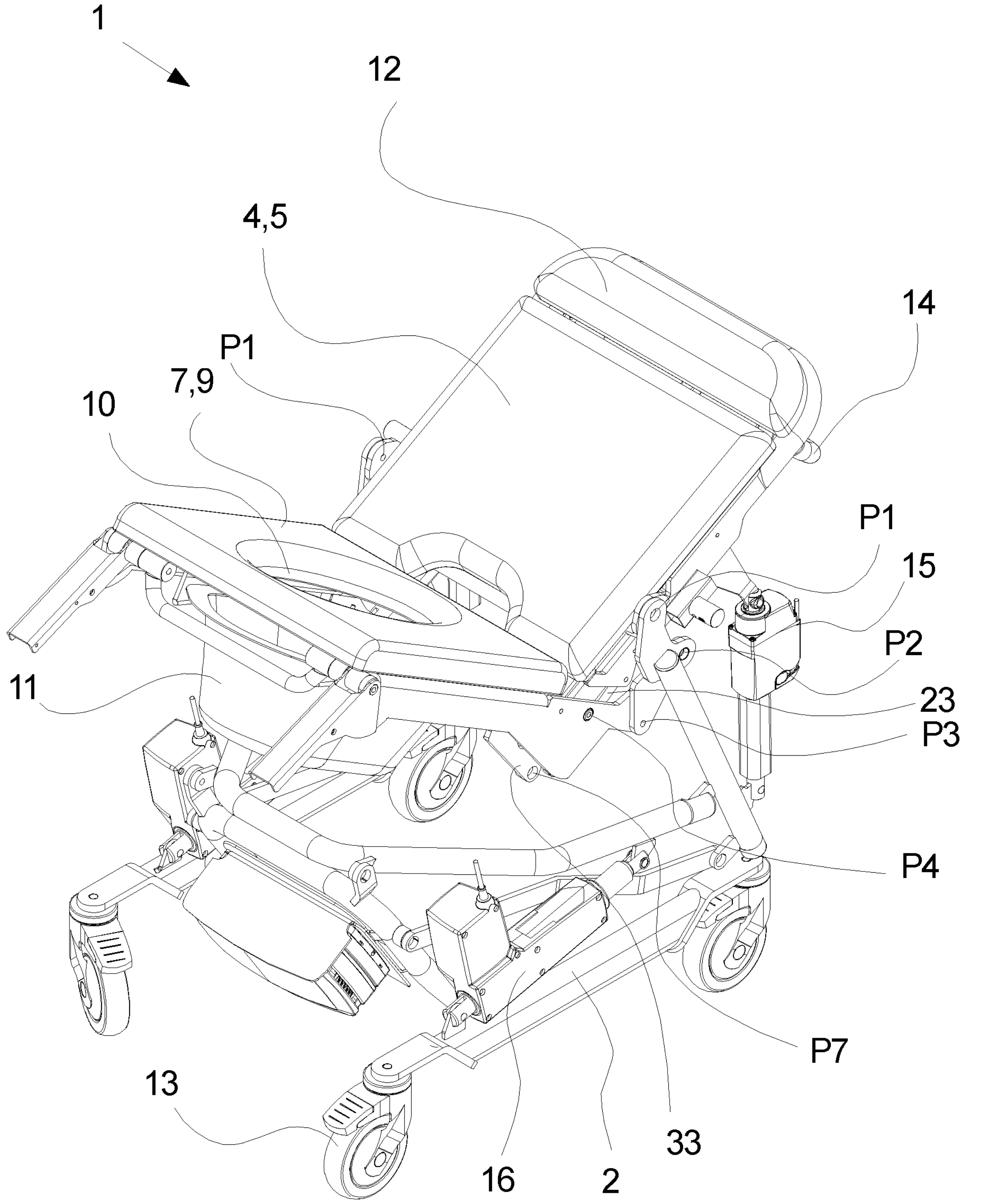

The invention will be described in the following with reference to the figures in which FIG. 1. illustrates the principle of the reclining chair in an upright position as seen from the side, FIG. 2 illustrates the principle of the reclining chair in a partial reclined position as seen from the side, FIG. 3 illustrates the principle of the reclining chair in a fully reclined position as seen from the side, FIG. 4 illustrates an embodiment of the reclining chair in an upright position as seen from the side, FIG. 5 illustrates an embodiment of the reclining chair in a reclined position as seen from the side, FIG. 6 illustrates an embodiment of the reclining chair in an upright position as seen in perspective, FIG. 7 illustrates an embodiment of the reclining chair in a partial reclined position as seen in perspective, and FIG. 8 illustrates an embodiment of the reclining chair in a fully reclined position as seen in perspective.

DETAILED DESCRIPTION

FIGS. 1-3 illustrate the principle of the reclining chair 1 in an upright position, partial reclined position and in fully reclined position, respectively and as seen from the side.

When the reclining chair 1 is to be reclined from an upright position as shown in FIG. 1 to a fully reclined position as shown in FIG. 3, the reclining motion is achieved by pulling or pushing the back part 4 backwards. As the back part 4 is moved backwards, the back frame 6 rotates around the fixed point P1 and the point P7, which is the connection point between the back frame 6 and the leg connection arm 33, moves forward whereby the seat part 7 moves forward as well. As the point P7 moves forward, the back frame arm 26, which is rigidly connected to the back frame 6, is also pushed forwards and thereby pulls on the lever arm 24. Since the lever arm 24 and the seat linking arm 25 are connected via the attachment point P5, the lever arm 24 will rotate around the attachment point P5 such that the connection arm 23 is pulled downwards. And since the connection arm 23 is connected to the back support 5, the back support 5 will also be pulled downwards. Since the back support 5 is slideable connected to the back frame 6 (via for example a set of back part bearings 41) the back support 5 and the back frame 6 slide in relation to each other.

In the beginning of the reclining motion, the angle α is substantially constant. This angle is maintained constant as long as the point P3 is to the right of the point P2. The first arm 21 and the point P3 rotate around the point P2 which is fixed on the chair frame 2 and at some point during the reclining motion, the point P3 will be positioned directly below the point P2. At this point, the reclining chair will start to "open" i.e. the angle α will increase as the reclining chair is further reclined and the point P3 moves to the left of the point P2, i.e. forward. It is thereby obvious, that the points P2 and P3 and the first arm 21 and second arm 22 determine when the "opening" stage begins. If the point P3 is positioned directly below in relation to P2 when the back part 4 is in the upright position, the angle α will start to increase immediately as the chair is reclined i.e. at the very beginning of the reclining motion. If, however, as shown in the embodiment of FIG. 1, the point P3 is positioned further to the right, i.e. further back, in relation to the point P2, the angle α will stay constant until the point P3 has moved to the left of the point P2. Thus, depending on the configuration of the first arm 21 and second arm 22 and the position of the arm pivot point P2 and arm suspension point P3, the correlation between the seat/back angle and the reclining angle may be linear or nonlinear.

The first arm 21 and second arm 22 could be adjustable such that the position of the points P2 and P3 could be adjusted before the reclining motion. This would provide for the possibility of adjusting at which stage the "opening" (angle α starts to increase) of the reclining chair should begin, for example at a large reclining angle β, i.e. at the beginning of the reclining motion or at a smaller reclining angle β. An early opening would be achieved by positioning the point P3 below the point P2 and a later opening would be achieved by positioning the point P3 to the right (as seen in FIGS. 1-3) of the point P3.

From a geometrical point of view it can be seen that if the attachment point P5 is positioned towards the point which connects the lever arm 24 and the connecting arm 23, a small levering effect is achieved, i.e. the displacement of the back support 5 is not as large per decrease of the reclining angle β. However, if the attachment point P5 is positioned at the other end of the lever arm 24, i.e. at the connection point between the lever arm 24 and the back frame arm 26, a large levering effect may be achieved and the back support 5 may displace more per decrease of the reclining angle β. It is therefore obvious that the positioning of the attachment point P5 should accommodate the positioning of the points P2 and P3 such that the friction between the back of the user and the back support 5 is reduced.

In this embodiment, the reclining chair also comprises a leg rest 30 which is mechanically linked to the reclining chair 1 via the reclining mechanism 20. The leg rest comprises a leg support 31 and a leg rest frame 32 which are slideable connected, for example via leg rest bearings 40. The leg support 31 is mechanically linked to the reclining mechanism via first leg connecting link 34, second connecting link 35 and leg connection arm 33. The leg rest frame 32 is linked to the leg connection arm 33 via the leg folding arm 36. When the back part 4 is reclined from the upright position to the reclined position, the leg connection arm 33 pushes on the leg folding arm 36 which in turn folds the leg rest 30 upwards. As the leg rest 30 folds upwards, the first leg connection link 34 and second leg connection link 35 push the leg support 31 downwards. And since the leg support 31 is slideable connected to the leg rest frame 32, the leg support 31 will slide in relation to the leg rest frame 32.

In this embodiment, the leg support 31 slides in relation to the leg rest frame 32 via the leg rest bearings 40. In another embodiment, the leg support 31 could slide by means of a linear glide bearing, slide rail or other type of mechanical sliding.

Furthermore, in this embodiment the back support 5 slides in relation to the back frame 6 via the back part bearings 41. In another embodiment, the back support 4 could slide by means of a linear glide bearing, slide rail or other type of mechanical sliding.

FIG. 4-5 illustrate an embodiment of a reclining chair 1 in upright position and in a reclined position, respectively and as seen from the side.

In this embodiment, the reclining motion is achieved by a recline actuator 15 is an electrical spindle actuator connected in one end to the frame 2 and in the other to the back part 4 and which pulls the back part 4 downwards such that the reclining chair 1 is moved from a substantially upright position to a substantially reclined position. In this embodiment, the recline actuator 15 reclines the back part 4 by pulling the back part 4 backwards. However, in another embodiment, the recline actuator 15 could induce the reclining motion by actuating any other component of the chair 1. For example, the recline actuator 15 could induce the reclining motion by pushing on the leg connection point P7. In another embodiment, the recline actuator could be connected between the points P2 and P7 or P4. It could also induce the reclining motion by actuating the leg rest (in an embodiment where the reclining mechanism comprises such a leg rest). It becomes apparent that the reclining motion may be induced by actuating any component which may connected to the reclining mechanism, as the movement of all these components are interrelated with each other via the reclining mechanism.

Naturally, the reclining motion could be driven manually, e.g. by pulling/pushing the back part 4 down via for example the chair handle 14 or by pulling/pushing on the leg rest 30.

In this embodiment, the head rest 12 is a separate part i.e. it is separate but connected to the back support 5. However, in another embodiment, the head rest 12 could be disconnected from the back support 5.

In this embodiment, the reclining chair comprises elevation actuator 16 for adjusting the elevation of the reclining chair 1 (the back part 4, the seat part 7 and the components attached thereto). This may be necessary in a wide range of implementations. For example if the user of the chair 1 has reduced mobility and may not by himself mount a bed. In such a situation, the chair may be reclined to a fully reclined position such that the user is in a substantially lying down position and afterwards the reclining chair 1 may be elevated such that the seat 9 and the back support 5 are in the same horizontal plane as the bed surface whereby the user may easier mount the bed.

If, as another example, the reclining chair 1 is used as a dentist chair, the elevation actuator 16 may provide for easy adjustment of the elevation of the chair 1 and thereby the patient such that the dentist may perform the relevant work in a comfortable working position.

In this embodiment, the elevation actuator 16 elevates the reclining chair by a scissor mechanism. However, in another embodiment, the elevation may be achieved by a series of actuators lifting the chair 1 directly and without any mechanical linkage, a lift, a pulley system or other kind of mechanism.

In an embodiment, the chair handle 14 may be provided with a user interface (not shown) and/or buttons for controlling the chair 1. The user interface could comprise a touch screen. For example, to ease the service personnel from manually reclining the chair 1, the chair handle 14 could comprise a "down" and "up" button (or other, similar command terms) such that the service personnel may operate the chair 1 via the actuator 14. The user interface (not shown) could also be used to drive the wheels 13 via driving motors connected to the wheels 13 such that the personnel may avoid manual pushing of the chair 1. This could be advantageous if, for example, a heavy user occupies the chair 1. It may also simply be necessary if the chair 1 must be moved on a slightly inclined surface 3, for example a wheelchair ramp. Naturally, the reclining chair 1 could also be pushed around by human power, e.g. to save weight and costs.

As already mentioned, a user of the reclining chair 1 could have such a reduced mobility that seemingly simple tasks such as dressing, and undressing may be challenging. Therefore, in this embodiment, the reclining chair 1 comprises a seat actuator 17 which may tilt the seat 9 via the seat actuation point P8 and the seat actuation arm 18 whereby the seat 9 is tilted in relation to the seat frame 8. This lifts the buttocks of the user away from the seat frame 8 such that e.g. pants and/or underwear may easier be pulled down towards the legs and off from the user. In an embodiment, the back part 4 could be provided with a back support actuator (not shown) and corresponding mechanism (not shown), whereby the back support 5 tilts in relation to the back frame 6 such that the lower part of the back of the user is lifted away from the back part 4. This could allow for easier dressing and undressing of upper body clothes.

FIG. 6-8 illustrate an embodiment of the reclining chair 1 in an upright position, partial reclined position and fully reclined, respectively and as seen in perspective.

If a user of the chair 1 has a reduced mobility it may sometimes be easier if the user may go to toilet in-situ, for example if service personnel is not nearby to aid the user or if the user occupying the reclining chair 1 is too far away from the nearest toilet. Therefore, in this embodiment, the reclining chair comprises an opening 10 and a bowl 11 for allowing the user to go to toilet anywhere. The bowl 11 could then be emptied at a later time. The container 11 could also comprise a closing mechanism such that it seals its content away from the user when the user finishes the toileting and the container may be kept closed until next time the user has to go to toilet. In an embodiment, the container could be provided with sensors (not shown) for signaling when the container 11 is full such that the service personnel may empty the container 11. The reclining chair 1 may be provided with a user interface (not shown) for allowing the user to e.g. press a button for opening and closing the container 11 before and after toileting.

The invention has been exemplified above with reference to specific examples of the positioning of the frame pivot point P1, arm pivot point P2, arm suspension point P3 and other. However, it should be understood that the invention is not limited to the particular examples described above but may be designed and altered in a multitude of varieties within the scope of the invention as specified in the claims.

LIST

1. Reclining chair
2. Frame
3. Underlying surface
4. Back part
5. Back support
6. Back frame
7. Seat part
8. Seat frame
9. Seat
10. Through opening
11. Container
12. Head rest
13. Chair wheel
14. Chair handle
15. Recline actuator
16. Elevation actuator
17. Seat actuator
18. Seat actuating arm
20. Reclining mechanism
21. First arm
22. Second arm
23. Connecting arm
24. Lever arm
25. Seat linking arm
26. Back frame arm
30. Leg rest
31. Leg support
32. Leg rest frame
33. Leg connection arm
34. First leg connecting link
35. Second leg connecting link
36. Leg folding arm
40. Leg rest bearing
41. Back part bearing
P1. Frame rotation point
P2. Arm pivot point
P3. Arm suspension point
P4. Chair joint
P5. Attachment point
P6. Leg pivot point
P7. Leg connection point
P8. Seat actuation point

The invention claimed is:

1. A reclining chair comprising:

a frame for supporting said reclining chair on an underlying surface, a back part comprising a back support slidably connected to a back frame, said back frame being hinged on a frame rotation point on said frame, a seat part comprising a seat frame and a seat, said seat part being pivotably connected to said back frame at a chair joint, and a reclining mechanism, wherein said reclining mechanism comprises an arm pivot point fixed to said frame and located behind said back frame, a first arm extending from said arm pivot point to a second arm at an arm suspension point also located behind said back frame, said second arm being pivotably connected to said chair joint, wherein, when said back part is reclined backwards from an upright position to a reclined position, said back frame rotates around said frame rotation point, said first arm rotates around said arm pivot point, said chair joint moves towards said seat part, a connecting arm extending from said back support and mechanically linked to said first arm and said second arm pulls said back support such that said back support slides in relation to said back frame and towards said seat part.

2. The reclining chair according to claim 1, wherein said seat part comprises a through opening and a container placed under said through opening.

3. The reclining chair according to claim 1, wherein said reclining mechanism further comprises a lever arm, a seat linking arm and a back frame arm, wherein said connecting arm is pivotably connected to a first end of said lever arm, said seat linking arm is pivotably connected to an attachment point on said lever arm, said back frame arm is pivotably connected to a second end of said lever arm and rigidly connected to said back frame.

4. The reclining chair according claim 3, wherein said attachment point is located between the ends of said lever arm.

5. The reclining chair according to claim 1, wherein said arm suspension point is located behind and in a lower position than said arm pivot point when said back part is in an upright position.

6. The reclining chair according to claim 1, wherein said reclining chair further comprises a leg rest pivotably connected to a leg pivot point and mechanically linked to said reclining mechanism (20).

7. The reclining chair according to claim 6, wherein said leg rest comprises a leg support and a leg rest frame and wherein said leg rest frame is pivotably connected to said leg pivot point, said leg support is mechanically linked to said reclining mechanism such that when said back part is reclined from an upright position to a reclined position, said leg rest rotates around said leg pivot point and folds upwards whereby said leg support slides in relation to said leg rest frame and away from said seat part.

8. The reclining chair according to claim 1, wherein said reclining chair comprises a recline actuator for reclining said reclining chair from an upright position to a reclined position.

9. The reclining chair according to claim 8, wherein said recline actuator is pivotably connected to said back part and said frame.

10. The reclining chair according to claim 1, wherein the chair accommodates an act of bathing a user.

* * * * *